United States Patent [19]
Kampmann et al.

[11] Patent Number: 5,510,597
[45] Date of Patent: Apr. 23, 1996

[54] WELDED COMPOSITE PANELS

[75] Inventors: Lutz Kampmann, Neunkirch; Peter Gloor, Neuhausen am Rheinfall, Switzerland

[73] Assignee: Alusuisse-Lonza Services Ltd., Switzerland

[21] Appl. No.: 409,348

[22] Filed: Mar. 23, 1995

Related U.S. Application Data

[62] Division of Ser. No. 295,219, Aug. 24, 1994.

[30] Foreign Application Priority Data

Sep. 17, 1993 [CH] Switzerland ............... 02809/93

[51] Int. Cl.⁶ ........................................... B23K 9/00
[52] U.S. Cl. ........................ 219/137 R; 219/121.64
[58] Field of Search ....................... 219/137 WM, 219/121.63, 121.64, 137 R

[56] References Cited

FOREIGN PATENT DOCUMENTS

| | | | |
|---|---|---|---|
| 62-238072 | 10/1987 | Japan | 219/137 WM |
| 5-104250 | 4/1993 | Japan | 219/137 WM |

*Primary Examiner*—Clifford C. Shaw
*Attorney, Agent, or Firm*—Bachman & LaPointe

[57] ABSTRACT

Joining of two elements of aluminium or aluminum alloys, where at least one element is the outer layer forming a part of a composite. The connection is made via a weld bead made by fusion welding at least one outer layer of the one element to the second element. The invention is particularly well suited for manufacturing complex, mechanically stable, load bearing structures of any desired shape that contain composites. The invention also concerns the method for fusion welding composites in which the preparation of the weld bead area is of decisive importance.

12 Claims, 2 Drawing Sheets

WELDED COMPOSITE PANELS

This is a division of application Ser. No. 08/295,219, filed Aug. 24, 1994, pending.

The present invention relates to the connection of two elements of aluminum or aluminum alloys, where at least the first element is an outer layer forming part of a composite comprising a thermally decomposable core and at least one outer layer, and relates also to a process for manufacturing such joints. The invention relates further to the use of the process for manufacturing complex load-bearing structures that are mechanically stable and are of any desired form.

Composites, such as 3 to 200 mm thick sandwich panels made up of e.g. two outer layers of corrosion resistant aluminum alloys and a plastic core are finding ever increasing application in the building industry because of their favorable material properties such as low weight, corrosion resistance and almost unlimited shaping possibilities. In architectural applications for example, composite materials are employed as facade cladding, or composites with a thermally insulating core of plastic, mineral wool, foamed aluminum or foamed glass are employed as load-bearing facade elements, dividing walls or door fillers and roofing. Such light-weight, but rigid building elements featuring a core of aluminum honeycomb, balsa wood, foamed aluminium or plastic between two outer sheets of high strength aluminum alloys also find extensive application in aircraft manufacture and in the aerospace industry.

In the following text the term composite material always signifies a mechanically stable and load-bearing material having a core and at least one outer layer.

Metal constructions can be manufactured relatively easily by mechanical shaping or in the case of aluminum sections for example by extrusion, and assembled into complex structures by bolting, riveting, welding or adhesive bonding. Composites on the other hand are usually produced in the form of panels. Using composites for complex constructions involves therefore more extensive joining than metal constructions.

Assembling or joining various composite material construction elements into complex composite structures has taken place up to now essentially by bolting, riveting, adhesive bonding or, in the case of composite materials with non combustible cores or core materials that do not decompose at high process temperatures, also by welding.

Because of the space they require, mechanical attachment means such as bolts or rivets used to join together structural composite elements limit the possibilities for constructing complex structures. Consequently that also limits the use of composites for such applications.

Adhesive bonding on the other hand often requires special surface cleaning; the strength achieved is often quite limited or the area to be bonded has to be very large, which again limits the possibilities of construction.

Constructing with composites acquires greater flexibility if the structural elements are joined by welding. Because of the temperatures developed during welding, that method of joining can be considered only for composites with thermally stable core materials.

Up to now the welding of materials with less stable, i.e. thermally decomposable, core materials such as plastics has always failed as a result of the destruction or decomposition of the core material as a result of the high temperatures that prevail during that joining process. As a result of the decomposition or combustion of the core material during welding, gases or vapors can be released in an uncontrollable manner, making it impossible to obtain uniform, pore-free welds. Consequently, it is impossible to achieve a durable, mechanically stable joint. Furthermore, the decomposition of the core material in the vicinity of the weld seam effects a reduction in the mechanical properties of the core and so of the whole joint; sometimes it even leads to at least partial elamination of the outer layers from the core.

SUMMARY OF THE INVENTION

The aim of the present invention is to avoid the above mentioned disadvantages and to effect the joining of two elements made of aluminum or aluminium alloys where at least one element is part of, viz., an outer layer of a composite material.

That aim is fulfilled by way of the invention in that the connection joint is a weld bead, made by fusion welding, that is situated at least in part between the outer layer of the first element and the second element.

The elements to be joined may be of aluminium, aluminium alloys or aluminium based alloys and their surfaces may be pretreated mechanically, physically and/or chemically. Surface treatment processes suitable for the elements to be joined are for example brushing, sand blasting, rolling, polishing, engraving, etching, filing, milling, anodizing, painting, caustic etching, chromate treatment, phosphate treatment, galvanizing, dispersion treatment, enamel coating, lamination coating or thermally spraying.

The object of the invention may concern the connection of a section or sheet of aluminium or aluminum alloys to at least one outer layer of a composite material. The section or sheet may be joined either to only one outer layer of the composite, or to the end face of a composite; in the latter case one or both outer layers of the composite may be joined to the section or sheet. Furthermore, the section or sheet may be joined at any desired angle to the outer surface or end face of the composite.

The object of the invention may, however, also concern a joint between at least one outer layer of a composite to at least one outer layer of a second composite or between parts of the very same outer layer of a composite, whereby, the outer layers thus welded together may lie at any desired angle to each other.

The connection of the outer layers of two composites may concern butt joining of the elements that are to be joined, or it may concern the joining of the core material of one element to the outer layer of the other element.

In the case of the joints according to the invention, especially when it concerns composites with thick cores, the end faces of the laminate core may additionally be adhesively bonded in order to provide support and reinforcement to the joint according to the invention.

Joining together parts of the one and the same outer layer of a composite may concern, for example, the fixation of a bent composite, the outer layer of which has been separated on the inner facing side of the bend, for example transverse to the direction of bending, in order to enable the bending operation to be carried out better.

The joint according to the invention always features a weld bead, made by fusion welding, that is saturated between two elements of aluminum or aluminum alloys i.e. the composite outer layers to be joined must be of aluminum or aluminum alloys.

Composites may be fiber reinforced high-tech materials with complicated layered structure or simply structured, favorably priced laminates in the form of sandwich panels.

As a rule sandwich panels are simple in structure, normally in the form of composite panels having a symmetrical laminas make-up with a core layer and two outer aluminum sheets. In such cases the aluminum outer sheets essentially determine the mechanical properties such as e.g. flexural stiffness, while the main role of the core is to maintain a given distance between the outer sheets. Apart from this basic structure, such laminates may feature further layers such as adhesive films or paint layers, with the result that a normal, commercially available laminate may readily feature 7 or more layers.

The properties of such laminates are for example low density, high flexural stiffness, good damping properties, high resistance to electrical discharging, ease of shaping, excellent flatness, almost any surface properties and good service life.

The applications open to using composite panels or composite semis in laminate form are therefore very varied; they range from shaped facade panels through cladding for roof edges, tunnels, walls and ceilings to weatherproof table tennis tables, display stands and vehicle superstructures.

BRIEF DESCRIPTION OF THE DRAWINGS

The present invention and possible applications of the process according to the invention are explained by way of example in the following with the aid of FIGS. 1 to 4, wherein.

DETAILED DESCRIPTION OF PREFERRED EMBODIMENTS

Figure 1:
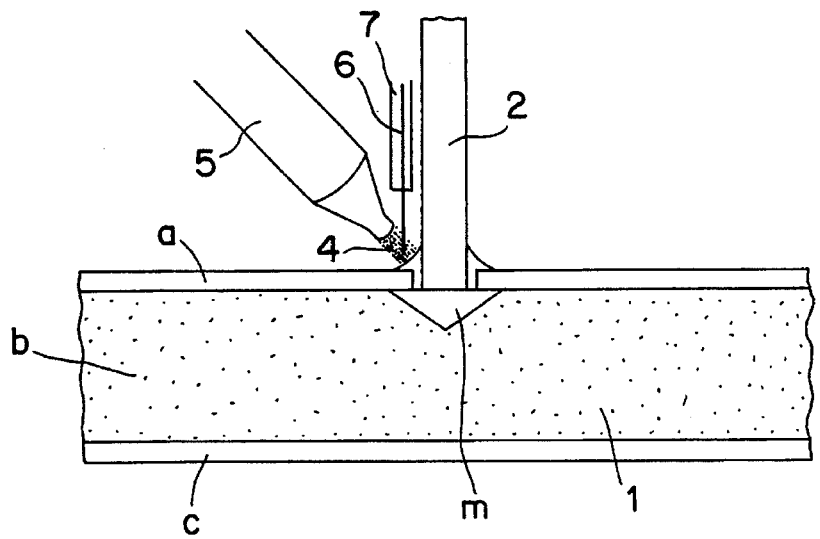
FIG. 1 shows a cross-section through a joint according to the invention between a sheet and the outer layer of a composite.

The joint according to the invention are based on fusion welding of at least one outer layer of a composite to a second element, whereby all commercially available materials of aluminum or aluminum alloys may be employed for the materials to be welded together.

The purity of the aluminum or the composition of the aluminum alloys is not critical for the joint according to the invention. In practice aluminum having a purity of 98.3% and better and aluminum based alloys with or without dispersion strengthening have proved to be suitable. Preferred are alloys for casting, rolling, wrought and forging out of aluminum. The thickness of the outer layers may be between 0.2 and 5 mm. In practice outer layers of thicknesses between 0.3 and 3 mm and in particular those between 0.3 and 1.5 mm have been found to be suitable.

The thermally decomposable core materials coming into question for the joint according to the invention are not critical. The composite materials employed may comprise, for example, cores of thermoplastics, elastomers or duroplastics, whereby cores of thermoplastics or duroplastics are preferred.

The cores may also contain, at least in part, cores or core materials that are not thermally decomposable.

The core materials may be reinforced by weaves or fibers and/or structured materials such as a honeycomb structure, for example. Specially preferred composite materials feature a core containing polyolefins, such as polyethylene (PE) or polypropylene (PP), foamed polyvinylchloride (PVC), foamed polyurethane, foamed polystyrene spheres bonded by epoxy resin, or foams containing polyesters. The cores may, in addition, also contain smaller or larger amounts of additives such as organic or inorganic fillers, for example pigments or mineral filler materials. If desired, the cores may also contain honeycomb shaped structures of aluminim or other materials.

The core materials may be joined to the outer layers by thermal or adhesive means. In addition, the core may comprise a plurality of layers joined by thermal or adhesive means.

The thickness of the core layer may amount to 1 to 300 mm, a thickness of 2 to 200 mm being preferred.

A preferred version of the joint according to the invention is such that the weld bead makes no direct contact with the core material. In order to ensure that this space is provided by a recess in the core material, the distance of the weld bead to the core material for the object according to the invention is preferably 0.5 to 5 mm and in particular between 1 and 3 mm.

In a particularly preferred version the surface of the core material created by this recess makes an acute angle of 45 to 60° to the outer layer undercut by the recess.

The residual joint areas created by the recess that are not welded, may if desired be adhesively bonded. This may, for example in the case of a butt joint between two composites, concern the parts of the end faces of the core created by the recess, or e.g. in the case of a right-angled joint between two composites, the surface between part of the outer layer created by the recess in one composite and the remaining end face of the other composite.

The end faces of the core layers participating in the joint according to the invention may at least partially make contact with the facing surface of the second element in the joint or be at a distance e.g. of less than 3 mm from each other. The mechanical properties of the joint depend partly on this distance: the larger the distance, the more elastic the joint. If there is no direct mechanical contact between the end faces of the core participating in the joint and the opposite lying element in the joint the transfer of mechanical forces takes place essentially via the metal layers that are joined. If on the other hand the end face of the core of the one element butts onto the second element of the joint, the mechanical forces are also transferred via the core layers and the joint is correspondingly stiffer. The same behavior applies in terms of thermal coupling of elements according to the invention or in terms of electrical parameters. The physical properties of the joint according to the invention can therefore be influenced via the design of the joint.

With respect to the process the object of the invention is achieved in that the connection is made by fusion welding of at least one outer layer of the composite material of the one element with the other element.

During the welding of composite materials gases and vapors may escape in an uncontrolled manner for example from the adhesive of the composite material or as a decomposition product of the core material. In order to obtain a pore-free and crack-free weld bead of high strength, the core material is, in terms of the present invention, preferably removed, prior to welding in the region of the welding, in such a way that a recess is produced and the distance between the place to be welded and the core material is 0.5 to 5 mm, in particular 1 to 3 mm. The undercut produced below the outer surface results in freely suspended ends of the outer layers concerned along a length of 0.5 to 5 mm. In addition, the surface of the core material created by the recess makes an acute angle of 45 to 60° to the surface of the undercut outer layer. The solution according to the invention ensures therefore that, during the joining of welding process, no gases and vapors or less of these are formed by decomposition of the core material, that any gases and vapors formed can escape almost without hindrance, and consequently molten metal is prevented from being ejected by gas pressure during welding, an effect which can lead to porosity or even to holes and cracks in the weld bead.

A preferred version of the process according to the invention is such that the areas to be joined are positioned at a distance of 0 to 3 mm from each other and then welded together.

The process according to the invention can also be employed to create mechanically stable joints with bent composites. For that purpose, prior to bending, the outer layer on the inner side of the bend is separated perpendicular to the direction of bending, the weld bead preparation according to the invention carried out by forming a recess below the separated outer layer and the composite bent; the mechanical fixation of the now bent composite is then made by welding the previously separated outer layer.

In the process according to the invention the fusion welding may be carried out using a laser beam. In that case the energy required for welding is supplied to the material by way of high energy light.

When laser welding aluminum or aluminum alloys one must take note that only a small amount of the emitted energy is absorbed by the surface: in the case of $CO_2$ lasers the fraction of absorbed energy is typically 2% of the emitted energy. This characteristic of aluminum surfaces means that lasers with very highly concentrated energy are required, which in turn reduces the possibility of employing laser welding to material thicknesses of typically 0.3 to 6 mm.

The concentrated power required for welding can be obtained using solid state or molecular lasers. Particularly suitable are solid state lasers such as the neodymium: YAG lasers or molecular lasers such as e.g. the $CO_2$ laser.

The most important molecular laser for shaping materials is the $CO_2$ laser which features over 100 wave lengths in the range 9.14 μm to 11.01 μm with a maximum intensity of 10.6 μm. It exhibits high efficiency and high output in continuous operation. A $CO_2$ laser of 2 to 15 kW is useful for the process according to the invention.

The most important solid state laser for technical applications is the Nd (neodymium): YAG laser. YAG is the abbreviation for Yttrium Aluminum Garnet ($Y_3Al_5O_{12}$). The most powerful emission of a Nd: YAG laser is at a wavelength δ= 1.064 μm. The short wavelength of the Nd: YAG laser represents a significant advantage of that kind of laser over the $CO_2$ type lasers. This makes it possible to conduct the light along glass fibers and provides better absorption of energy during laser treatment of aluminum alloys. Suitable and useful for the process according to the invention are Nd: YAG lasers with a power output of 0.5 to 3 kW, in particular 1 to 1,4 kW.

The laser welding process according to the invention may be carded out with or without a welding alloy e.g. in the form of a welding rod.

Such welding alloys serve mainly as filler metal to maintain weld bead thickness when the gap between the areas to be joined is large. The choice of welding rod/wire composition depends on the composition of the materials to be joined and on the properties required of the welded joint. Particularly well suited filler metal alloys for the process according to the invention are those with compositions such as those in Table 1:

TABLE 1

| Alloy type | Alloy code DIN 1732 | AA* |
|---|---|---|
| Al 99.5 | S-Al99.5 | 1050 A |
| AlMg3 | S-AlMg3 | ≈5554/5654 |
| AlMg4.5Mn | S-AlMg4.5Mn | 5183 |
| AlMg5 | S-AlMg5 | 5356 |
| AlSi5 | S-AlSi5 | 4043 A |
| AlSi12 | S-AlSi12 | 4047 A |

*International Alloy Registration

In order to guarantee that the welding wire melts during laser welding, the diameter of the wire must be the same as or smaller than the diameter of the focused laser beam. The rate of feed of wire depends on the rate of welding, the depth of welding and the width of the gap.

The filler metal rod/wire may be preheated inductively in order to keep to a minimum the necessary amount of heat fed to the material during welding.

For the laser welding process according to the invention the preferred conditions when using a $CO_2$ laser are: a welding rod of 1.0 mm diameter at a feed rate of 0.8 to 1.2 m/min along with a beam 0.9 to 1.2 mm in diameter. The welding speed that can be achieved under these conditions lie between 1.3 and 2.4 m/min. Without filler rod the welding speed is typically between 0.9 and 1 m/min. With a pulsed Nd:YAG laser the pulse frequency is typically 30 Hz. The protective atmosphere employed during laser welding is preferably a He/At mixture, the mount of inert gas mixture fed being typically 8–12 l. The inert gas atmosphere may, however, also contain up to 1 vol. % $N_2$, preferably around 0.5 Vol. % $N_2$.

A further version of the process according to the invention lies in the application of a pulsed welding process optimized for welding speed. In principle welding process that are suitable are those such as TIG welding (tungsten-inert-gas welding), or MIG (metal-inert-gas welding).

In the case of MIG welding the electric arc is formed in an inert gas between a wire electrode that is consumed and the part to be welded. A high current density enables high welding speeds to be achieved but, however, also causes the welding rod electrode to be melted at a high rate.

In the case of TIG welding the electric arc is formed in an inert gas atmosphere between a tungsten electrode which does not melt and the part to be welded. The tungsten electrode only serves to supply electric current during the welding process.

Both TIG and MIG welding belong to the so called inert gas welding methods. These methods are such that, during welding, the electrode, the arc and the welding zone are enshrouded in an atmosphere of inert gas such as e.g. argon, helium or mixtures thereof. In special cases, such as e.g. during the welding of thick sheet or plate, a mixture of inert gases containing e.g. nitrogen or oxygen may be employed.

Aluminum and aluminum alloys frequently exhibit a stable, tightly bonded oxide layer with a high melting point (over 2000° C.). To achieve good quality welds, that layer must be removed before or during the welding operation. In inert gas welding processes this normally takes place as a result of the cleaning effect of the ionised protective gas and the effect of electrons flowing from the workpiece to the electrode.

In the conventional MIG process direct current and positively poled electrode are employed; in conventional TIG welding alternating or direct current is used along with a negatively poled electrode.

Conventional MIG welding is chosen mainly for welding 3 to 50 mm thick material, conventional TIG welding for 0.5 to 10 mm thick material. In general with MIG welding the welding speed that can be achieved is two to three times that achieved with TIG welding.

With MIG and TIG welding methods the electrodes may be fed either direct current (dc) or alternating current (ac) in any form. When welding with direct current, the electrode may be the negative or positive pole. A negatively poled electrode emits electrons which, on striking the workpiece which forms the anode, release their kinetic energy in the form of heat. About two thirds of this energy is absorbed by the workpiece, one third by the electrode.

Negatively poled electrodes are, however, normally unsuitable for TIG and MIG welding of aluminum as they do not produce any cleaning effect. An exception here is TIG-dc-He-minus pole welding of aluminum in which the high concentration of heat in the workpiece not only removes the oxide skin, but breaks it up in such a way that a good weld joint can be achieved.

If the electrode is positively poled, the electrons flow from the melt pool to the electrode. The heat is distributed therefore in the reverse ratio to that with a negatively poled electrode. Furthermore, when the electrode is the positive pole, the oxide skin in the weld zone is removed by the combined action of the stream of electrons and the positively charged ions of the inert gas.

The inert gas prevents air from reaching the weld pool. It also has a stabilizing effect on the welding arc. The single atom noble gases such as argon and helium or mixtures thereof have been found suitable for aluminum and aluminum alloys.

The different conditions that arise with direct current due to polarity can be combined in a simple manner using alternating current. Particular attention must be drawn however to the problem of distortion, due to high heat input, that can arise using alternating current. This distortion can be counteracted by choosing a square wave current supply and by influencing the electric arc.

Although the melting point (630°–660° C.) is much lower than that of steel, welding aluminum calls for about the same amount of heat as for steel. This is due to the high thermal conductivity and heat of fusion of aluminum.

Shrinkage during the solidification of aluminum and the large mount of thermal expansion and contraction during the heating and cooling resp., can under some circumstances lead to welding cracks, distortion and internal stresses. Counteracting that is the low modulus of elasticity and the lower welding temperatures. The distortion is very dependent on the welding method used and so is less with those introducing small mounts of heat than those introducing larger amounts of heat.

In the case of the process according to the invention there is a further reason for having to keep the heat input to the substrate to a minimum: As the materials to be joined may contain plastic cores and adhesives that exhibit only limited stability with respect to thermal effects, the temperature of the process must be kept as low as possible while welding.

These objectives are fulfilled by way of the invention in that the fusion welding is carried out using TIG or MIG pulsed arc welding processes.

In pulsed welding the basic current supply has superimposed on it pulses of current usually in rectangular wave form, the frequency, width and height of which can be set independently. This way the energy supply to the material to be welded can be optimally adjusted to suit the wide variety of material combinations such as section/composite or composite/composite.

As with all welding methods the aim with the process according to the invention is to achieve optimum weld seam quality at maximum welding speed. These optimum welding parameters can be readily obtained by means of preliminary trials, in each case here referring to a MIG or TIG pulsed arc welding method optimised for welding speed.

The processes according to the invention may be carried out with or without addition of a filler metal (see Table 1). These filler metals are normally in the form of welding wires having a diameter of 0.8, 1.0, 1.2, 1.6 or 2.4 mm, whereby for TIG and MIG pulsed arc welding methods a diameter of 1.2 mm is particularly preferred. Further, the filler metal may be preheated inductively.

With the TIG pulsed arc method an inert gas atmosphere preferably of argon or a mixture of argon/helium is used, whereby a small amount of oxygen, up to 2 Vol. % may be added to this mixture. A typical amount of gas added is 8 l/min of Ar or Ar/He and possibly 1 Vol. % $O_2$. With a narrow arc this permits excellent penetration, accompanied by a narrow heat affected zone and low load on the tungsten electrode.

A wide arc without significant penetration is however particularly suitable for joining thin workpieces. The TIG pulsed arc welding method is suitable for manual or mechanized welding workpieces with a thickness of 0.5–6 mm.

Typical values for the TIG process according to the invention are a pulse frequency of 500 Hz. welding current 80–120A, filler metal feed rate 1.2–1.5 m/min and welding speed 0.4 to 0.8 m/min.

When using the MIG pulsed arc welding method for the fusion welding process according to the invention a protective atmosphere of argon or an argon/helium mixture is preferred, possibly containing a small fraction, less than 2 Vol. % $O_2$. In particular workpieces thicker than 1.5 mm may be welded by this method.

The possible applications of the process according to the invention are explained by way of example in the following with the aid of FIGS. 1 to 4.

Illustrated in FIG. 1 is the joint between a sheet 2 and a composite 1, containing a core b and two outer layers a and c. The weld preparation according to the invention in the form of a recess m in the core material b is also shown there.

Figure 2:
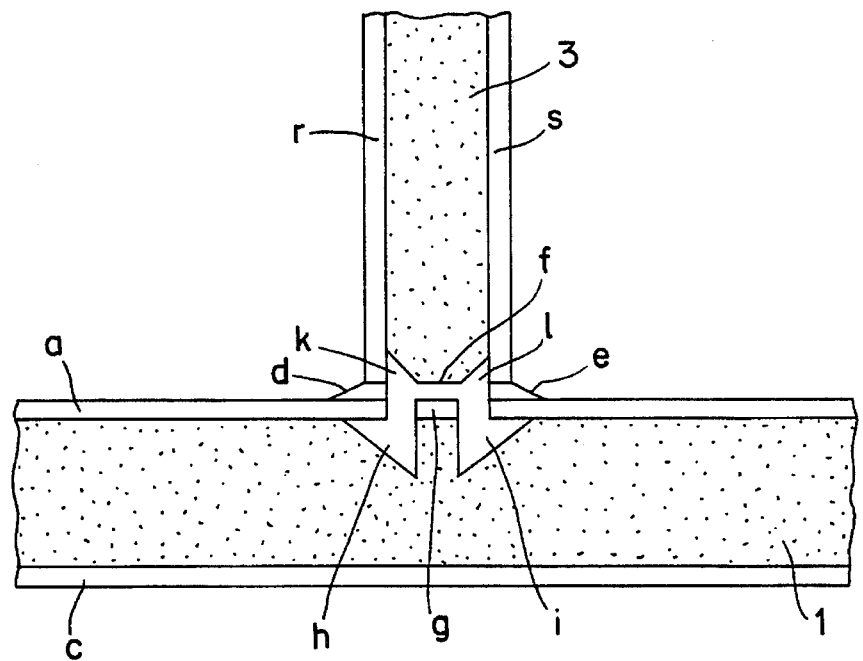
FIG. 2 shows schematically a cross-section through two composites that have been joined perpendicular to each other.

FIG. 2 shows the right angled connection of two composites 1 and 3 made by means of welding the two outer layers of element 3 to the outer layer a of element 1.

The recesses h and i, and k and l, in the cores of composites 1 and 3 resp., are located near the weld beads d and e. The part g of the outer sheet of composite 1 created by recesses h and i, may at least press against or be adhesively bonded to the part of the composite 3 remaining between recesses k and l.

Figure 3:
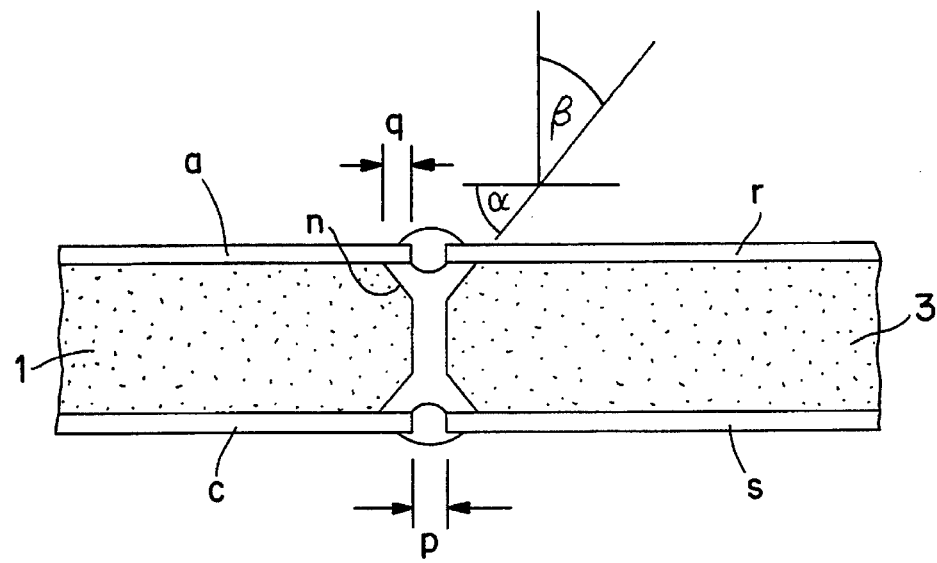
FIG. 3 shows schematically a butt weld between two composites.

FIG. 3 shows schematically the arrangement of two composites 1 and 3 for butt weld joining. Before welding, the surfaces a and r, and c and s resp., to be joined are positioned at a distance p of 0 to 3 mm apart. Also shown is the weld bead preparation in the form of recesses in the cores. For that, the core material in composites 1 and 3 are removed from the region under the areas to be welded so that there is a distance q= 0.5 to 5 mm between the core material and the places to be welded. Also shown is the acute angle α= 45 to 60° formed by the surface n of the core recess and the outer layer, and the corresponding angle β between surface n and the vertical to the outer layer. The angles α and β are complementary in that together they make up an angle of 90°, so that the angle β lies between 30 and 45°.

Figure 4:
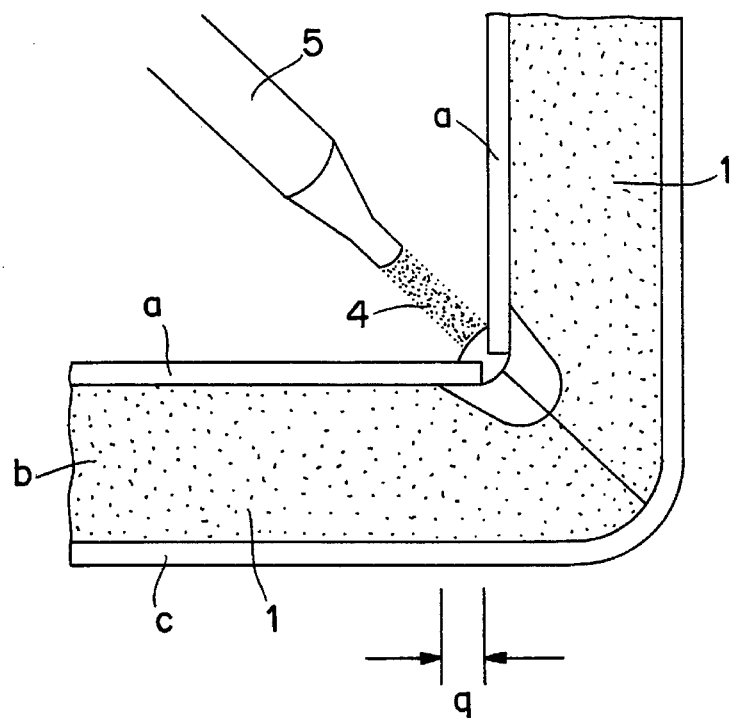
FIG. 4 shows the principle of securing a bent composite.

FIG. 4 illustrates the principle of securing a bent composite 1 in the desired form. For that purpose, prior to bending, the outer layer a on the inside of the bend is separated (transverse to the direction of bending) and the core material removed on both sides of the separation line t to such an extent that the core material b is a distance q=0.5–5 mm from the parts of the outer layer to be welded. After bending, the separated outer layer ends are welded together in order to give the bent composite its mechanical strength.

The present process according to the invention permits composites to be employed as structural elements in complex, mechanically stable and load bearing structures of any desired shape.

Furthermore, this makes possible new and wider growing applications for composites in fields such as architecture or transportation. Also the present invention permits the advantages of composites such as sound proofing or small weight to volume ratio to be exploited in the construction of larger and complex structures.

We claim:

1. Process which comprises: joining two elements of aluminum or aluminum alloys, wherein at least one element is a composite material containing a thermally decomposable core and at least one outer layer; fusion welding a connection between said at least one outer layer of the composite material and the other element; and including the step of removing a portion of the thermally decomposable core in the region to be welded prior to welding to such an extent that a recess is formed between the outer layer and the core material at the region to be welded.

2. Process according to claim 1, including the step of forming an undercut as a result of the recess in the core material, below the outer layer and the surface of core material, said recess thus created making an acute angle of 45 to 60° with the outer layer.

3. Process according to claim 1, in which the areas to be joined are set at a distance of 0 to 3 mm from each other and then welded together.

4. Process according to claim 1, in which the fusion welding is performed under a protective gas atmosphere with inert gases.

5. Process according to claim 4, wherein said inert gases contain up to 2 vol. % oxygen or up to 1 vol. % nitrogen, wherein the inert gases are noble gases selected from the group consisting of argon, helium and mixtures thereof.

6. Process according to claim 1, in which for the fusion welding a welding alloy in the form of a filler metal wire is added and, in order to minimize the amount of heat to be added, the filler metal wire is inductively preheated.

7. Process according to claim 1, wherein said removing step creates a distance of 0.5 to 5 mm between the outer layer and the core material at the region to be welded.

8. Process according to claim 1, wherein both elements are composite materials, each containing a thermally decomposable core and at least one outer layer.

9. Process according to claim 8, wherein the elements to be joined constitute a bent composite, and wherein a separation is formed in the outer layer of said bent composite on the inside of the bend prior to bending and transverse to the direction of bending, and after bending the separated areas are joined again by welding.

10. Process according to claim 1, including the step of fusion welding a direct, material to material connection between said at least one outer layer and the other element.

11. Process according to claim 1, wherein the fusion welding is a fusion welding method selected from the group consisting of (1) TIG or MIG pulsed arc welding, and (2) laser welding.

12. Process according to claim 11, in which the laser employed is a $CO_2$ laser, having a power rating of 2–15 kW or a Nd:YAG laser, with a power rating of 0.5–3 kW.

* * * * *